United States Patent
Toyoda

(10) Patent No.: US 7,322,437 B2
(45) Date of Patent: Jan. 29, 2008

(54) STRUCTURE FOR ATTACHING A WHEEL SPEED SENSOR IN MOTORCYCLE

(75) Inventor: Hidetoshi Toyoda, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 167 days.

(21) Appl. No.: 11/073,070

(22) Filed: Mar. 4, 2005

(65) Prior Publication Data

US 2005/0247499 A1 Nov. 10, 2005

(30) Foreign Application Priority Data

Mar. 23, 2004 (JP) ............................. 2004-085371

(51) Int. Cl.
*B62M 7/00* (2006.01)

(52) U.S. Cl. .................... 180/219; 188/26; 324/173

(58) Field of Classification Search ................ 180/219, 180/218, 220; 280/276, 279; 303/168; 324/166, 324/173

See application file for complete search history.

(56) References Cited

U.S. PATENT DOCUMENTS

| 6,492,805 | B1 * | 12/2002 | Wakabayashi et al. | ...... 324/173 |
| 2006/0066294 | A1 * | 3/2006 | Ishida | ........................ 324/166 |
| 2006/0202553 | A1 * | 9/2006 | Nimura et al. | ............... 303/168 |

FOREIGN PATENT DOCUMENTS

| ES | 2192946 | 10/2003 |
| JP | 04-191186 | 7/1992 |
| JP | 4191186 | 7/1992 |
| JP | 07012149 A | 1/1995 |
| JP | HEI 7-17609 | 4/1995 |
| JP | 2002-029395 | 1/2002 |
| JP | 2002029395 | 1/2002 |
| JP | 2003-065369 | 3/2003 |
| JP | 2003065369 | 3/2003 |

OTHER PUBLICATIONS

Bike, Tower Publishing Services Ltd, Leicestershire, GB, No. 367, Oct. 8, 2003, pp. 26-28, XP002372069 ISSN: 0140-4547.
Bike Magazine May 1994, No. 253, p. 16, Peterborough, GB Yuko Sugeta, author of articles.

* cited by examiner

*Primary Examiner*—Tony Winner
(74) *Attorney, Agent, or Firm*—Carrier, Blackman + Associates, P.C.; Joseph P. Carrier; William D. Blackman

(57) ABSTRACT

A motorcycle includes radial mount type disk brakes, a brake caliper of the disk brake is mounted on a lower portion of a front fork, which pivotably supports a front wheel, the wheel speed sensor is attached to a mounting boss disposed at the lower portion of one leg of the front fork so as to dispose the wheel speed sensor between the brake caliper and the wheel axle. This mounting location is desirable in terms of lowering costs and ease of brake maintenance.

15 Claims, 3 Drawing Sheets

STRUCTURE FOR ATTACHING A WHEEL SPEED SENSOR IN MOTORCYCLE

CROSS-REFERENCE TO RELATED APPLICATIONS

The present invention claims priority under 35 USC 119 based on Japanese patent application No. 2004-085371, filed on Mar. 23, 2004. The subject matter of this priority document is incorporated by reference herein.

BACKGROUND OF THE INVENTION

1. Field of the Invention

The present invention relates to a motorcycle having disc brakes in which a brake caliper of a disk brake is mounted on a mounting boss disposed at a lower portion of a front fork. The mounting direction of the brake caliper is arranged along a radial direction of the front wheel. The present invention relates more particularly to an improvement in a structure of attaching a wheel speed sensor for detecting a speed of a front wheel.

2. Description of the Background Art

A motorcycle in which a wheel speed sensor detecting a speed of a front wheel is attached to a lower portion of a front fork is already known. Such a wheel speed sensor is disclosed in Japanese Examined Utility Model Publication No. 17609/1995. Further, as disclosed in Japanese Unexamined Patent Publication No. 12149/1995, there is known a disk brake of radial mount type used, for instance, with a racing motorcycle. In this document, a mounting direction of a brake caliper is set to be along a radial direction of the wheel to enhance the ease of attaching and detaching the brake caliper.

In a motorcycle in which the brake caliper of the disk brake of radial mount type is attached to the lower portion of the front fork, it is desirable to dispose a wheel speed sensor at a position that does not inhibit a replacement of the brake caliper. Further, the position of the wheel speed sensor is advantageous in terms of the cost and maintenance of the components.

The present invention has been developed based on the foregoing, and an object of the present invention is to provide an improved structure for attaching a wheel speed sensor in a motorcycle in which a brake caliper of a disk brake of radial mount type is attached to a lower portion of a front fork. Specifically, a structure is provided in which the wheel speed sensor is disposed at an advantageous position in terms of the cost and maintenance.

SUMMARY OF THE INVENTION

To attain the above object, according to a first aspect of the invention there is provided a structure for attaching a wheel speed sensor to a wheel in a motorcycle. The motorcycle includes a disk brake for braking the front wheel, and the front wheel is pivotably supported on a front fork. In the inventive structure, a brake caliper of the disk brake is mounted on a mounting boss disposed at a lower portion of a front fork, the brake caliper is mounted so as to have a mounting direction aligned with a radial direction of the front wheel, and a wheel speed sensor is attached to the mounting boss.

According to a second aspect of the invention, the mounting boss in the above described structure is formed integrally with, and continuously from, an axle supporting portion which is formed at a lower end of the front fork to pivotably support the front wheel.

According to a third aspect of the invention, the above described structure further includes another mounting boss having the brake caliper mounted thereto, said mounting bosses are separated in a vertical direction and formed at a lower portion of the front fork. The wheel speed sensor is attached to an under surface of a lower one of the mounting bosses.

According to the first aspect of the invention, the wheel speed sensor is attached to the mounting boss, which is disposed at the lower portion of the front fork. The mounting boss is used to attach the radial mount type disc brake to the wheel of the motorcycle. Thus, it is possible to dispose the wheel speed sensor at a position which permits replacement of the brake caliper without interference with the wheel speed sensor. In addition, it is possible to omit an exclusive, or dedicated, mounting structure for the wheel speed sensor, such as a boss, a stay, or the like. These features facilitate the maintenance of the disk brake and reduce overall costs.

According to the second aspect of the invention, exclusive, or dedicated, members to which the brake caliper of the disk brake and the wheel speed sensor are attached are omitted, thereby reducing the number of members.

According to the third aspect of the invention, the wheel speed sensor is disposed so as to efficiently utilize a space below the mounting boss.

Modes for carrying out the present invention are explained below by reference to an embodiment of the present invention shown in the attached drawings. The above-mentioned object, other objects, characteristics and advantages of the present invention will become apparent form the detailed description of the embodiment of the invention presented below in conjunction with the attached drawings.

DETAILED DESCRIPTION OF THE INVENTION

A present embodiment of the invention will now be described as shown in the accompanying drawings.

Figure 1:
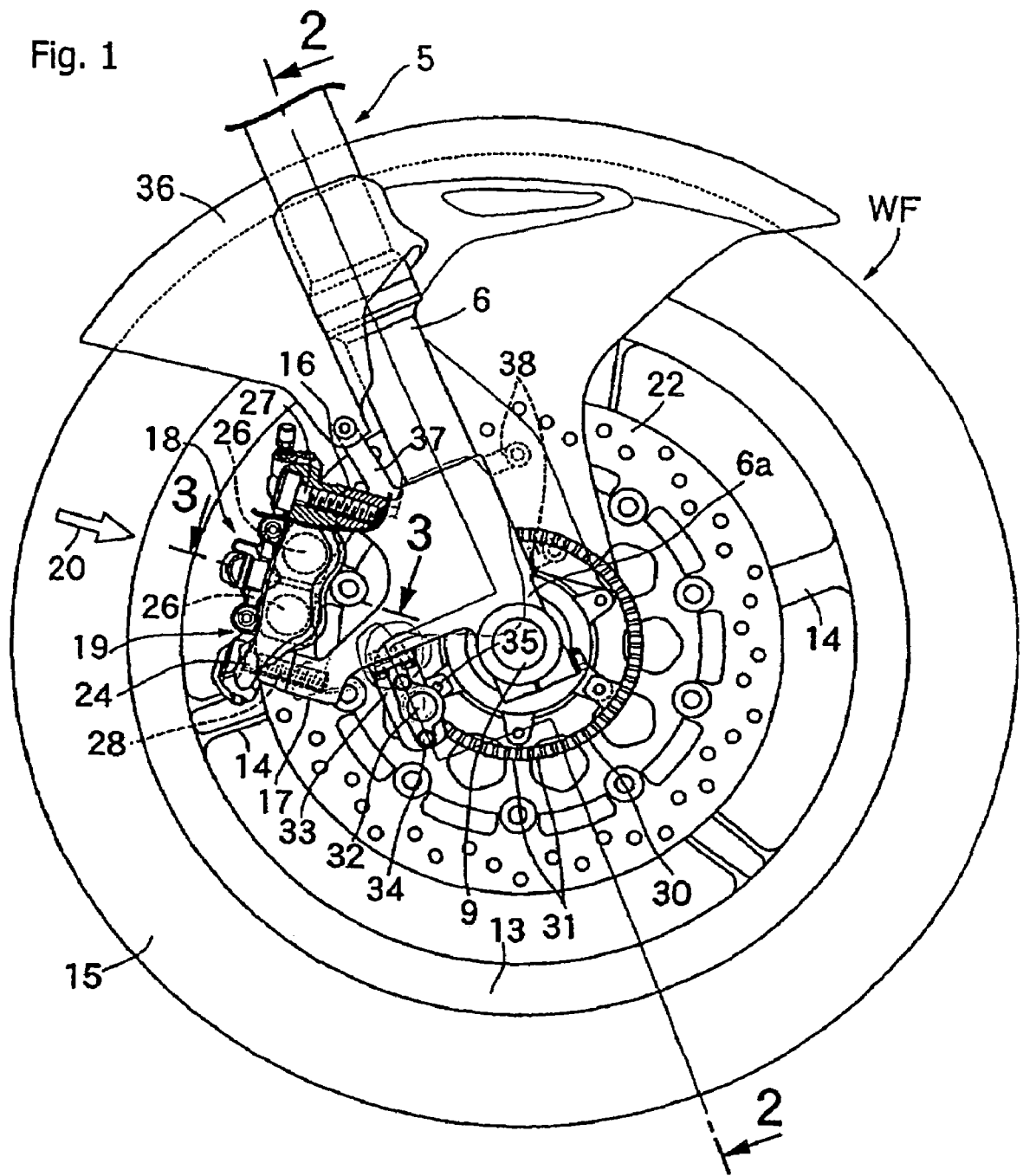
FIG. 1 is a partially cutaway side view of a front wheel of a motorcycle and its vicinity, showing the mounting structure for a brake caliper mounted at a lower end of the front fork so as to extend radially therefrom, and showing the wheel speed sensor secured to an underside of the mounting structure.
Figure 2:
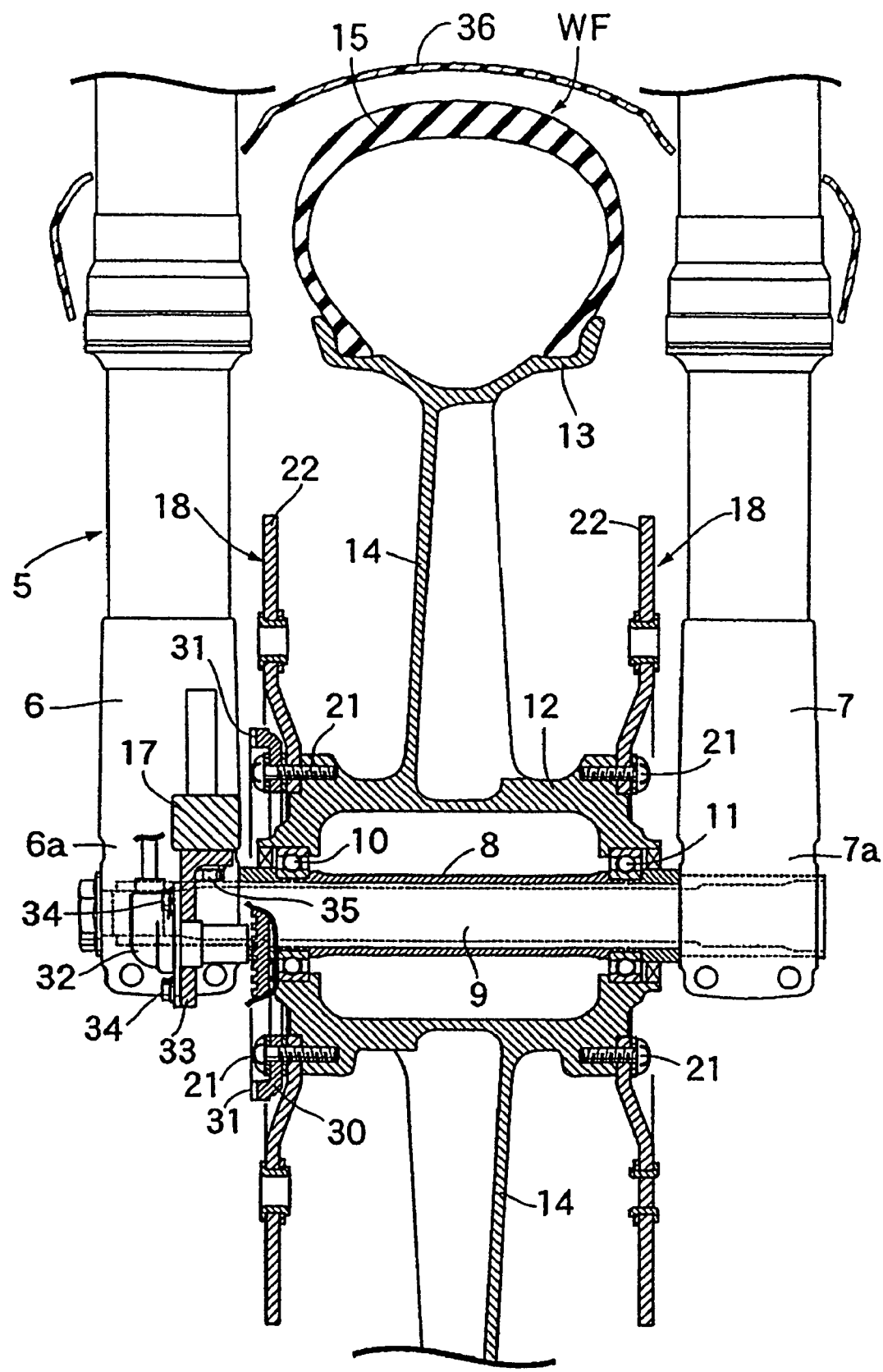
FIG. 2 is a cross-sectional view taken along a line 2-2 in FIG. 1, showing the wheel speed sensor mounted to an underside of a mounting boss using an L shaped support plate.

Referring first to FIGS. 1 and 2, a front fork 5 of the motorcycle has a pair of legs 6, 7 disposed on opposed sides of a front wheel WF. Each of the legs 6, 7 has an axle supporting portion 6a, 7a at its lower end. An axle collar 8, and an axle 9 disposed through the axle collar 8, are fixedly disposed between the axle supporting portions 6a, 7a. The axial positions of the axle collar 8 and axle 9 are fixed.

The front wheel WF comprises a cylindrical hub 12 coaxially enclosing the axle collar 8. A pair of ball bearings 10, 11 is interposed between the hub 12 and the axle collar 8. A rim 13 coaxially surrounds the hub 12, and a plurality of spokes 14 integrally connects the hub 12 and the rim 13. A tire 15 is placed on the rim 13 so as to surround the rim 13.

A pair of mounting bosses 16, 17 are formed integrally with and continuously from the axle supporting portion 6a, 7a so as to be positioned at a lower portion of each of the legs 6, 7 of the front fork 5. Mounting bosses 16, 17 extend in parallel and are separated in a vertical direction. Respective brake calipers 19 of a pair of disk brakes 18 for braking the front wheel WF are mounted on respective pairs of the mounting bosses 16, 17. The respective brake calipers 19 are mounted in a mounting direction 20 (see arrow in FIG. 1) corresponding to and aligned with a radial direction of the front wheel WF.

Figure 3:
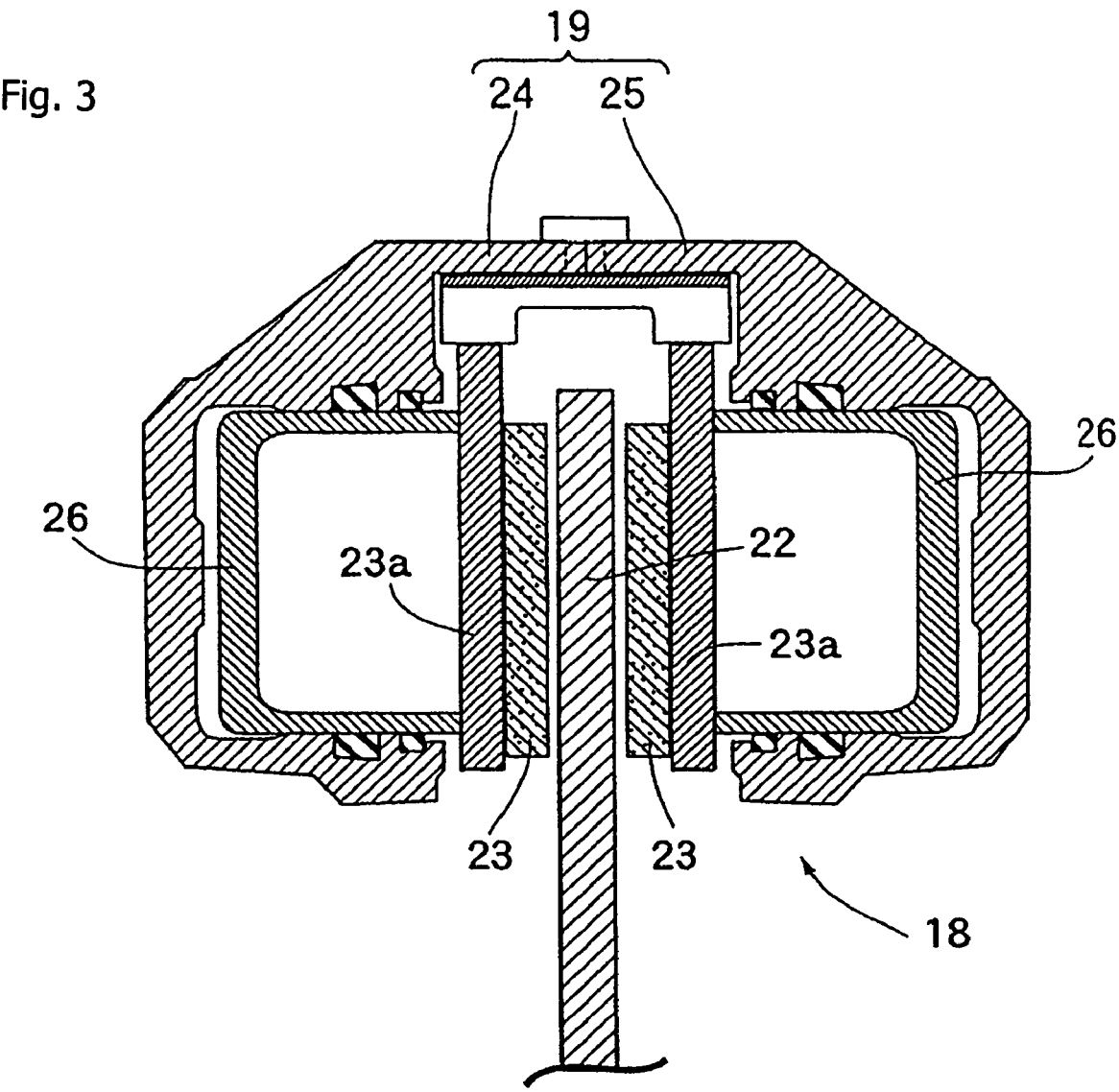
FIG. 3 is a cross-sectional view taken along a line 3-3 in FIG. 1, showing the structure of the brake caliper with respect to the disk.

Referring also to FIG. 3, each of the disk brakes 18 comprises a brake disk 22 attached to an end of the hub 12 using a plurality of screw members 21. Each of the disk brake 18 also includes a pair of friction pads 23, 23 disposed on opposite sides of the brake disk 22, and the brake caliper 19 extending from one side of the disk brake 22 to the other side thereof over a circumference of the disk brake 22 to support the friction pads 23, 23. The brake caliper 19 comprises an acting portion 24 and a reacting portion 25 that are connected to each other.

In each of the acting portion 24 and the reacting portion 25, there is slidably fitted a piston 26. The metal backings 23a, 23a of the respective friction pads 23, 23 disposed on opposed sides of the brake disk 22 are pushed by the respective pistons 26 and thereby brought into frictional contact with the brake disk 22.

The disk brake 18, constructed as described above, is of radial mount type. The acting portion 24 of its brake caliper 19 is fastened to the bosses 16, 17 with a pair of mounting bolts 27, 28. Each mounting bolt 27, 28 has an axis along a radial direction of the front wheel WF.

A pulser ring 30, made of a magnetic metal, is held in contact with a central portion of an outer surface of the brake disk 22 of the disk brake 18. The pulser ring 30 is disposed on the right side of the front wheel WF. The pulser ring 30 is integrally fastened to a left side end of the hub 12 jointly with the brake disk 22, using the screw members 21. As a result, the pulser ring 30 rotates with the front wheel WF.

A multiplicity of protrusions 31 are formed at an outer circumference of an outer side of the pulser ring 30. The protrusions are provided with an equal spacing therebetween in the circumferential direction. A wheel speed sensor 32 is fastened to a support plate 33 with bolts 34 so as to oppose to the protrusions 31, and to be spaced apart from the protrusions by a small distance. The wheel speed sensor is a magnetic proximity sensor for detecting a speed of the front wheel WF by detecting the protrusions 31.

The support plate 33 is used to mount the wheel speed sensor to the mounting bosses 16, 17. The support plate 33 is substantially L-shaped and fastened with bolts 35 to the under surface of the mounting boss 17. Note that mounting boss 17 is the lower one of the pair of mounting bosses 16, 17 formed at the right one 6 of the legs 6, 7 of the front fork 5. That is, the wheel speed sensor 32 is disposed at the lower portion of the front fork 5 and on the right side of the front wheel WF, and is attached, via the support plate 33, to the under surface of the lower one 17 of the mounting bosses 16, 17 that are disposed integrally with the lower portion of the right side of the front fork 5.

The upper side of the front wheel WF is covered by a front fender 36. A pair of attaching plates 37, 38, each having a protruding shape, are formed integrally with a lower part of each of the legs 6, 7 of the front fork 5. The front fender 36 is fastened to the two pairs of attaching plates 37, 38.

Operation of this embodiment will now be described. The brake calipers 19 of the disk brakes 18 for braking the front wheel WF are respectively mounted on the mounting bosses 16, 17 at the lower portions of the respective legs 6, 7 of the front fork 5. The front fork 5 pivotably supports the front wheel WF, and legs 6, 7 are disposed on opposed sides of the front wheel WF. The brake calipers 19 are mounted on the mounting bosses 16, 17, so as to be oriented in a mounting direction 20 aligned with a radial direction of the front wheel WF. The wheel speed sensor 32 is attached via the support plate 33 to the mounting boss 17 disposed in the leg 6 of the right side. The wheel speed sensor 32 is positioned generally between the brake calipers 19 and the axle 9.

The wheel speed sensor 32 is attached to the mounting boss 17. The mounting boss 17 is disposed at the lower portion of the front fork 5 in order to mount the brake caliper 19 of the disk brake 18 of radial mount type thereon. Therefore, the wheel speed sensor 32 can be disposed at a position which does not interfere with replacement of the brake caliper 19. In addition, it is unnecessary to provide a dedicated mounting member for the wheel speed sensor 32 such as a boss, stay, or the like. These features facilitate the maintenance of the disk brake 18 and reduce manufacturing and maintenance costs.

The axle supporting portions 6a, 7a are formed at the lower ends of the legs 6, 7 of the front fork 5. The mounting bosses 16, 17 are formed integrally with, and continuously from, the respective axle supporting portions 6a, 7a. Thus, an exclusive member for mounting the brake caliper 19 of the disk brake 18 thereon can be omitted. Further, since the wheel speed sensor 32 is attached to the mounting boss 17, and since the mounting boss 17 is formed integrally with and continuously from the axle supporting portion 6a of the right side, an exclusive member for attaching the wheel speed sensor thereto can be omitted. Thus, the number of members can be reduced.

In addition, the wheel speed sensor 32 is attached to the under surface of the lower one 17 of the mounting bosses 16, 17. The mounting bosses 16, 17 are formed to be separated in a vertical direction on the right leg 6 of the legs 6, 7 of the front fork 5. Thus, the space below the mounting boss 17 is efficiently utilized.

Although the present embodiment of the invention has been described above for purposes of understanding, the invention is not limited thereto, but may be embodied with various modifications and variations, without departing from the spirit and scope of the invention as defined in the claims.

What is claimed is:

1. In a motorcycle comprising:
   a front wheel,
   a disk brake for braking the front wheel, the disk brake including a brake caliper, and
   a front fork pivotably supporting the front wheel,
   the improvement comprising a structure for attaching a wheel speed sensor to the motorcycle, wherein said structure comprises:
   a mounting boss disposed at a lower portion of the front fork, the mounting boss providing a mounting direction for the brake caliper along a radial direction of the front wheel and having the brake caliper mounted thereon, wherein the mounting boss is formed integrally with, and continuously from, and axle supporting portion formed at a lower end of the front fork;

another mounting boss formed integrally with, and continuously from, the axle supporting portion, and having the brake caliper mounted thereto, wherein the mounting bosses are separated in a vertical direction, and wherein the wheel speed sensor is attached to an under surface of a lower one of the mounting bosses.

2. The structure for attaching a wheel speed sensor to a motorcycle of claim 1 wherein the wheel speed sensor comprises a magnetic proximity sensor, the front wheel comprises a magnetic pulser ring fixed to the front wheel so as to rotate with the front wheel, and the wheel speed sensor is mounted adjacent to the pulser ring and cooperates with the pulser ring to determine wheel speed.

3. The structure for attaching a wheel speed sensor to a motorcycle of claim 1 wherein the wheel speed sensor is positioned generally between the brake caliper and an axle of the front wheel.

4. In a motorcycle comprising:
a front wheel,
a disk brake for braking the front wheel, the disk brake including a brake caliper, and
a front fork pivotably supporting the front wheel,
the improvement comprising a structure for attaching a wheel speed sensor to the motorcycle, wherein said structure comprises:
a mounting boss disposed at a lower portion of the front fork, the mounting boss providing a mounting direction for the brake caliper along a radial direction of the front wheel and having the brake caliper mounted thereon;
another mounting boss having the brake caliper mounted thereto,
wherein the mounting bosses are separated in a vertical direction, and the wheel speed sensor is attached to an under surface of a lower one of the mounting bosses.

5. The structure for attaching a wheel speed sensor to a motorcycle of claim 4, wherein the lower one of the mounting bosses is provided with a support bracket secured to the under surface thereof, and wherein the wheel speed sensor is fixed to the support bracket.

6. The structure for attaching a wheel speed sensor to a motorcycle of claim 4, wherein the support bracket is substantially L-shaped.

7. A motorcycle comprising:
a front wheel including an axle,
a disk brake for braking the front wheel, the disk brake including a brake caliper,
a front fork pivotably supporting the front wheel axle,
a wheel speed sensor,
a mounting boss disposed at a lower portion of the front fork extending radially outward relative to the front wheel axle,
wherein the brake caliper is mounted on the mounting boss along a radial direction of the front wheel, and
wherein the wheel speed sensor is attached to a portion of the mounting boss out of interference of mounting the caliper to the mounting bracket.

8. The motorcycle of claim 7, wherein the brake caliper is mounted on a radially distal end of the mounting boss, and wherein the wheel speed sensor is attached to a lower surface the mounting boss.

9. The motorcycle of claim 7, wherein the wheel speed sensor is positioned generally between the brake caliper and the front wheel axle.

10. The motorcycle of claim 7, wherein the mounting boss is formed integrally with, and continuously from, an axle supporting portion which is formed at a lower end of the front fork.

11. The motorcycle of claim 10, further comprising another mounting boss formed integrally with, and continuously from, the axle supporting portion, and having the brake caliper mounted thereto, wherein the mounting bosses are separated in a vertical direction, and the wheel speed sensor is attached to an under surface of a lower one of the mounting bosses.

12. The motorcycle of claim 7, further comprising another mounting boss formed integrally with, and continuously from, the axle supporting portion, and having the brake caliper mounted thereto, wherein the mounting bosses are separated in a vertical direction, and the wheel speed sensor is attached to an under surface of a lower one of the mounting bosses.

13. The motorcycle of claim 12, wherein the lower one of the mounting bosses is provided with a support bracket secured to the under surface thereof and wherein the wheel speed sensor is fixed to the support bracket.

14. The motorcycle of claim 13, wherein the support bracket is substantially L-shaped.

15. The motorcycle of claim 7 wherein the wheel speed sensor comprises a magnetic proximity sensor, the front wheel comprises a magnetic pulser ring fixed to the front wheel so as to rotate with the front wheel, and the wheel speed sensor is mounted adjacent to the pulser ring and cooperates with the pulser ring to determine wheel speed.

* * * * *